March 13, 1934.  N. MINORSKY  1,950,946

NAVIGATIONAL INSTRUMENT

Filed Feb. 28, 1930   2 Sheets-Sheet 2

INVENTOR.
Nicolai Minorsky
BY Frank H. Borden
ATTORNEY.

Patented Mar. 13, 1934

1,950,946

UNITED STATES PATENT OFFICE 1,950,946

NAVIGATIONAL INSTRUMENT

Nicolai Minorsky, Swarthmore, Pa., assignor to Pioneer Instrument Company, Incorporated, Brooklyn, N. Y., a corporation of New York Application February 28, 1930, Serial No. 432,108

1 Claim. (Cl. 33—204)

This invention relates to navigational instruments. More specifically it relates to and has as an object to provide magnetic compasses having cards actuated by the power of a motor energized by an external source of current and so arranged as to secure at a lower cost with magnetic compasses, the same well known results which are attained with gyroscopic compasses: for example the control from the single master compass of several repeater compasses operating in synchronism with the latter.

An apparatus of this type, as far as its broad principle is concerned, is practically the same as that which is described in the U. S. Patent application #390,346, filed September 4, 1929. The details of the instrument of the type above referred to, are different, however, since instead of stabilizing the ship, air ship or any other moving vehicle on a predetermined course, the stabilizing system controls only the compass card as well as the synchronous transmiting system connected to said card. The present invention while offering all the advantages inherent in gyroscopic compasses, is considerably simpler in its use and, being less expensive, is more accessible to the vessels of moderate displacement in which the introduction of gyroscopic compasses is militated against by their complexity as well as by their high price.

The instrument forming the subject of this invention has certain corrections similar to those of gyroscopic compasses which must be taken care of by the navigator during the voyage. It will be clear that the instrument of the type to be described can have exactly the same applications as the gyroscopic compass, namely: control of automatic steering devices, introduction of the base line in the fire control apparatus, actuation of the course recording apparatus during the manual steering, and so on.

The following description is illustrated by the appended drawings in which

Figure 1:
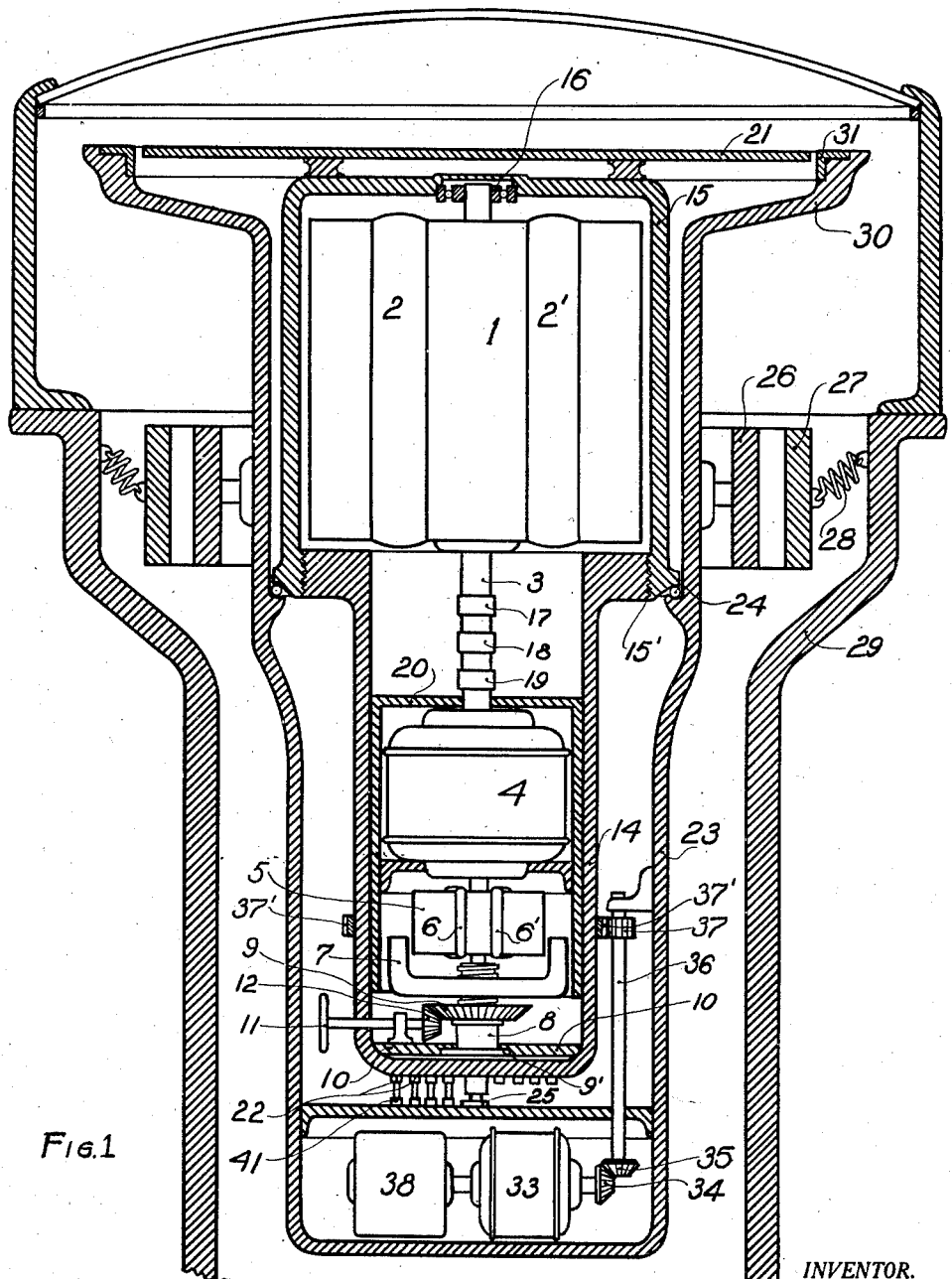
Fig. 1 is a cross section of the earth inductor master compass.
Figure 2:
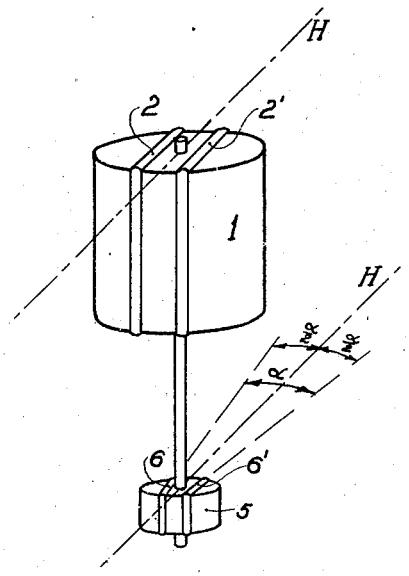
Fig. 2 is a detail of the mechanical arrangement of the coils.

It will be noted that the numerals shown of Fig. 2, 3, 4, are the same as on Fig. 1.

Referring to Fig. 1, 1 designates an armature or rotor preferably, although obviously not necessarily of cylindrical form about the vertical axis to be described, made of an insulating material such as bakelite, which material may contain laminations (not shown) made of alloys having a high permeability when placed in weak magnetic fields, such as permalloy, hypernic and the like, in order to increase the flux of the horizontal component penetrating into the drum. The drum 1 is keyed on a shaft 3 made preferably of a non-magnetic steel. The drum 1 has two slots in which are placed two coils, respectively, 2 and 2', having a great number of turns of fine wire. The two half coils are connected electrically so as to form one single coil. The arrangement of the two half-coils is dictated by considerations of symmetry with respect to the shaft 3.

The shaft 3 has collector or slip rings 17, 18, 19 placed below the rotor 1, and carries the armature of a small motor 4 and a small armature or rotor 5, made of discs of soft iron. The rotor 5 has two coils 6, 6', shown more clearly on Fig. 2. The planes of the coils 6, 6' form the angle $a$ to each other as shown on Fig. 2. The magnitude of this angle is an important constant of the instrument; its significance will be apparent from a study of the performance in connection with Fig. 4. The rotor 5 is also keyed on the shaft 3 but there is no necessity that the plane bisecting the angle $a$ formed by the coils 6, 6' should be parallel to the plane of the coils 2 as shown on Fig. 2.

Figure 3:
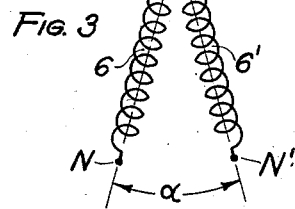
Fig. 3 shows a detail of the electrical connections of the coils.

From the electrical viewpoint the coils 2, 6, and 6' are mounted as shown on Fig. 3; the points M, N, N' of the connections are also connected to the collector or slip rings in some suitable manner. The lower part of the shaft 3 is supported by means of a step bearing in the upper part of the column 8, which latter has threads on its upper part as shown and is capable of being turned or rotated around its axis (which is also the axis of the shaft 3). Owing to the provision of flange 9' on the bottom of column 8 which is seated in a corresponding circular opening in the disc 10, the column 8 with the parts which it supports are maintained in rotatable vertical alignment with shaft 3 and in an invariable position relatively to the casing 14 within which the column 8, armature 5 and the motor 4 are mounted.

The same casing 14 continues by another cylindrical casing 15 supporting a bearing 16 for the upper of the shaft 3. This casing 15 is fixed to the casing 14, as for instance by means of a threaded part 15'.

The compass card 21 is fixed on the upper part of the casing 15. The cylindrical casings 14, 15, the card 21 with all the parts contained inside (of the casings) form a special system actuated by the follow-up motor (to be described), which system can be designated as a follow up or direction maintaining system.

The follow up system can move freely about the axis of the instrument (coaxial with the axis of the shaft 3) by means of a step bearing, gudgeon or pivot 25 and a ball race 24, with respect to the external system 23 having also an approximately co-axial cylindrical form. This external system 23 is suspended by means of gimbal rings 26, 27 and springs 28, absorbing any vibration which may come from the external support 29 fixed to the moving body. The slip or collector rings of the rotating system are connected by means of sliding contacts (not shown) to the rings 22 on the lower part of the follow up or direction maintaining system. The sliding contacts 41 fixed to the external system 23, enable thus to bring the voltages induced between the rings 17, 18, 19, to the external system 23, and from there through the rings of the gimbal suspension to the fixed support 29. It must be noted that, unless stated to the contrary, all the metal parts of the instrument must be made of a non-magnetic material such as bronze, brass, and the like.

Coming back to the parts contained inside of the follow-up system, 7 is a permanent magnet mounted on threaded column 8 suitably guided, (by guides not shown) so as to move parallel to itself along the axis of the instrument when said column 8 is rotated (about its axis), by means of a handle 11 connected therewith by means of suitable gearing 12 and 9. It is thus apparent that when magnet 7 is prevented from turning (by means of any guiding member not shown on the figure) it is possible to make the magnet 7 go up or down when the handle 11 is turned in one or the other direction. By this method one can vary the flux penetrating from the magnet into the armature 5 as well as the magnitude of electromotive forces induced in the coils 6, 6', all other things being the same.

The small motor 4 is intended for keeping the rotating system at a given rate of rotation. Since there exists always a leakage flux escaping from the motor 4, as well as from the magnet 7 (which, by the way, can be replaced by an electromagnet) it is necessary to surround the apparatus giving rise to the leakages with a suitable cylindrical screen 20, made preferably of materials of high permeability in the feeble magnetic fields. Attention must be paid, however, to the fact that these screening shields must not be saturated by these leakage fluxes. Under those conditions the coil formed of the half coils 2 and 2', subjected to the action of terrestrial flux, is not disturbed by the leakage fluxes.

The rotation of the follow up system with respect to the external system 23 is obtained by means of a small motor 33, actuating through suitable gears 34, 35, the shaft 36, supported by the bearings fixed to the external system 23. The shaft 36 has a spur gear 37 meshing with toothed ring gear 37' fixed to the follow up system as shown on Fig. 1.

It is understood of course that any desirable intermediary gears can be placed between the motor 33 and the shaft 36 in order to limit the speed of the latter to a suitable value.

Having described the mechanical part of the earth inductor compass, it is necessary now to specify the arrangement of the electrical circuits as well as the performance of the instrument.

Figure 4:
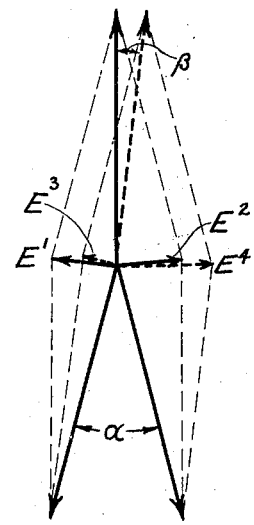
Fig. 4 shows a vector diagram of electromotive forces relative to the performance of the instrument.

The electrical connections of the coils 2, 2', 6, 6' are shown on Fig. 3 and the vector diagram of the alternating electromotive forces induced in these coils for a symmetrical position shown on Fig. 2, is shown on Fig. 4 in full lines. It follows therefrom that for this symmetrical position the maximum values of the electromotive forces induced between the points MN and MN' are $E'$ and $E^2$ (Fig. 4).

Figure 5:
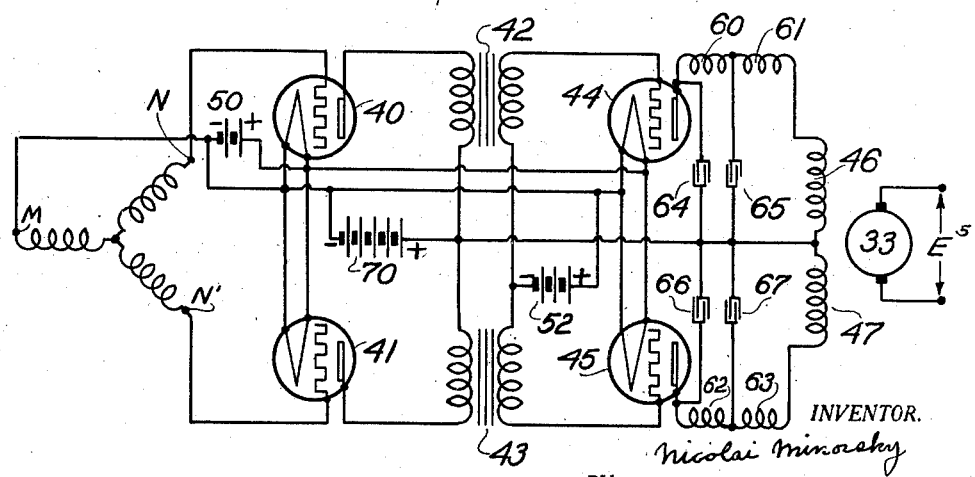
Fig. 5 shows the wiring diagram of the control circuits.

The electrical connections are shown on Fig. 5. The point M (the end of the terrestrial coil) is connected to the point 50 connected to the negative terminal of a heating battery of thermionic three electrode valves 40, 41, 44, 45. The points N, N' are connected to the grids of the high amplification valves 40, 41. The coupling transformers 42, 43 are connected by their primaries in the plate circuits of the valves 40, 41, and the secondaries (high voltage) are connected together to the point 50 connected to the common negative pole of the A battery 52. The free ends of the secondaries are connected to the grids of the valves 44 and 45. It must be noted that the primary impedance of the transformers 42, 43 must be comparatively high in order to obtain a reasonable amplification from the valves 40, 41, whose internal impedance is generally considerable. As, on the other hand, the frequency is low being due to the mechanical rotation of the rotors, it follows therefrom that the primary inductance must accordingly be high. In other words, special transformers must be used whose magnetic circuit is made preferably of high permeability laminations, having on the primary side a considerable number of turns of fine wire. The secondary must have a still greater number of turns, depending upon the desired ratio of transformation.

The thermionic valves 44, 45 of Fig. 5 are power valves. Owing to a grid battery 52, the operating point of the valves 44, 45 is adjusted to be at zero current point, when no electromotive forces are induced in the secondaries of transformers 42, 43. At this point, the valves are able to rectify. It follows, therefrom, that when electromotive forces are induced in the secondaries the valves 44, 45 allow the passage of half waves of the rectified current, approximately in proportion to the corresponding half waves of the alternating potential applied to the grids of the valves 44, 45. In series with the plates of the valves 44, 45 are connected filter systems comprising inductance coils 60, 61, 62, 63 and condensers 64, 65, 66, 67 connected as shown on Fig. 5.

In series with the coils 60, 61 is connected the field circuit 46 of the differential excitation of a direct current motor 33 indicated on Fig. 1 by the same numeral. Another circuit 47 (of the differential field) of the motor 33, is connected in series with the coils 62, 63. The remaining ends of the differential field are connected together and to the positive terminal of the battery 70 or any other source of potential energizing the amplifier system. The theory of electric filters shows that in a system of the type described comprising inductance coils 60, 61 and condensers 64, 65 (for the valve 44) for adequate values of inductances and capacities, the system allows the passage of a substantially continuous current through the coil 46; the magnitude of this current is approximately equal to the average value of the rectified direct current.

Having described the mechanical and electrical parts of this invention it is possible now to describe the performance of the magnetic directional instrument.

For a symmetrical position shown in full lines on Fig. 4, the two electromotive forces induced between the points MN on the one hand and between MN' on the other hand, are equal and are represented in the vector diagram of Fig. 4 by E' and $E^2$. Whence it follows that the alternating voltages applied to the grids of the valves 40, 41 as well as the amplitudes of alternating components of the plate currents through the primaries of transformers 42, 43, are equal. The secondary induced voltages in transformers 42, 43 are also equal and hence the amplitudes of the alternating components of the plate currents of the valves 44, 45 are equal accordingly. In view of what has been stated in connection with the filters the direct currents flowing through the coils 46, 47 of the differential field of motor 33, are equal also. As an example I have shown on Fig. 5 an arrangement in which the brushes of the motor 33 are connected to a consistent potential difference $E^5$, at which no appreciable current flows through the armature even when it is at a standstill. In this particular case the currents in the coils 46, 47, being the same, the motor 33 is at rest since its field is zero.

If the ship or any other moving vehicle departs from this symmetrical position by an angle $\beta$, the symmetrical diagram of Fig. 4 is modified. This is explained in detail in connection with analogous patent application Ser. No. 390,346, filed September 4, 1929.

One of the diagonals representing the resultant E. M. F. E', for example, becomes smaller $E^3$, and the other $E^2$, becomes greater $E^4$. If the first mentioned E. M. F. is impressed, for example, on the grid of the valve 40 (and the second on the grid of the valve 41) the corresponding plate current variations of the valve 40, as well as the E. M. F. induced in the secondary of the transformer 42, decrease. This causes a decrease of the plate current of the direct current flowing through the coil 46 of the differential field, of the motor 33. By analogous considerations it is easy to see that an opposite action occurs in the valves 41, 45 which finally causes an increase of direct current in the coil 47. The motor 33 acquires its field and starts. Its rotation moves the follow-up system in azimuth through the gears 37, 37'. The electrical connections must be established in such a manner that the azimuthal motion of the follow up system thus produced, decreases the original angle of departure $\beta$ which caused the unbalancing of the vectors E', and $E^2$ shown on Fig. 4.

It follows from the above that the follow-up system with the compass card affixed thereto, is stabilized on the magnetic meridian, which is in this way the position of stable equilibrium for the above described system of azimuthal stabilization.

In order to transmit from the master instrument of this kind synchronous indications of the azimuth to other repeating dials or repeaters I can use any well known apparatus for synchronous transmission used for similar purposes either in gyroscopic compasses or otherwise.

The synchronous transmission system does not form the subject of this invention and for that reason is indicated conventionally on Fig. 1 as an apparatus 38 whose movable element (rotor) is fixed on the shaft of the follow up motor 33. It is understood that the stator of the transmitting system 38 is connected in any well known manner to the repeating apparatus placed in different points of the ship or to any other apparatus whose performance is similar to that of a repeating device of the type referred to.

By analogy with a gyroscopic compass requiring latitude and speed corrections, the present earth inductor compass must be corrected from time to time in order to take into account the variations of magnetic declination on the earth's surface, as well as the variations of intensity of the horizontal component of the earth's magnetic field. These two corrections are generally known and given by magnetic charts. These corrections can be introduced in the following manner. The first correction is obtained by adding to the upper part 30 of the system 23 a ring 31 with the lubber line on it. The ring 31 can be displaced in azimuth relatively to the system 30 through an angle equal to that of magnetic declination. The reading of the card according to the actual position of the lubber line will give the true course of the ship and not the course referred to the magnetic meridian.

The second correction is obtained by means of handle 11, whose angular position can be graduated directly in fractions of gauss. It has been already mentioned that all other things being equal the magnitude of electromotive forces induced in the coils 6 and 6' depend on the position of the magnet 7 and consequently on the position of the handle 11 transmitting the axial motion to the magnet by means of the gears 9 and 12. This second correction permits of obtaining the equality between the electromotive forces induced in the coils 6 and 6' and the E. M. F. induced in the coil 2 by the horizontal component of the terrestrial field.

I wish it to be understood that the above described instrument must be treated as an ordinary magnetic compass. It must be compensated in the well known manner by means of the spheres of soft iron and other known methods of compensation usually applied to ordinary magnetic compasses.

I wish it to be understood that the above description must be considered only as an example and not in a limiting sense since many other embodiments of the same invention can be constructed without any departure from the spirit and scope of the appended claims. For example, the performance of the instrument remains the same if the described arrangement is modified as follows: instead of two coils 6 and 6' whose planes form a certain angle $a$ to each other, one single coil 6 is employed, but instead of two half coils 2, 2' used originally these coils are inclined to each other by the same angle $a$, instead of being parallel to each other.

While only one embodiment of the invention has been illustrated and described, various changes and modifications in the relative arrangement of parts, which will now appear to those skilled in the art, may be made without departing from the scope of the invention. Reference is, therefore, to be had to the following claim for a definition of the limits of the invention.

It is apparent that the simplified arrangement having only one line of valves, while being simpler than the differential or "push pull" arrangement shown on Fig. 5 has a disadvantage of not having a kind of automatic compensation of errors which may result, for instance, from any speed variations of the instrument.

I claim:

In an earth inductor compass, a binnacle, a support pendulously mounted in said binnacle, a lubber's mark carried by said support, a rotatable casing journaled in said support for rotation about a vertical axis, a compass card carried by said casing and cooperating with the lubber's mark to indicate direction, a vertical shaft journaled in said casing, an armature mounted on one end of said shaft for generating an electromotive force by the horizontal component of the earth's magnetic field, two coils mounted on the other end of the shaft at an angle to each other, means carried by the casing for providing an artificial magnetic field in which the two coils are rotated to produce two other alternating electromotive forces having a fixed phase relation to each other, means for rotating the shaft, armature and coils, means for adjusting the artificial field producing means to establish a predetermined course, means for combining the three electromotive forces whereby to produce two different electromotive forces which vary inversely to each other upon deviation from the predetermined course, said last-named means including means for combining said last two electromotive forces to produce a differential electromotive force which is a function of the angle of deviation from the predetermined course, and an electric motor carried by the pendulous support and energized by the differential electromotive force for rotating the casing and compass card by an amount equal to the deviation from the predetermined course.

NICOLAI MINORSKY.